United States Patent
Oikawa et al.

(10) Patent No.: US 6,994,924 B2
(45) Date of Patent: Feb. 7, 2006

(54) MAGNETIC RECORDING MEDIUM AND MANUFACTURE METHOD THEREFOR

(75) Inventors: Tadaaki Oikawa, Nagano (JP); Takahiro Shimizu, Nagano (JP); Hiroyuki Uwazumi, Nagano (JP); Naoki Takizawa, Nagano (JP); Myabi Nakamura, Nagano (JP)

(73) Assignee: Fuji Electric Co., Ltd., Kawasaki (JP)

( * ) Notice: Subject to any disclaimer, the term of this patent is extended or adjusted under 35 U.S.C. 154(b) by 97 days.

(21) Appl. No.: 10/273,364

(22) Filed: Oct. 18, 2002

(65) Prior Publication Data

US 2003/0087131 A1 May 8, 2003

(30) Foreign Application Priority Data

Oct. 18, 2001 (JP) .................................. 2001-320799

(51) Int. Cl.
*G11B 5/66* (2006.01)
*G11B 5/70* (2006.01)

(52) U.S. Cl. .................................. 428/831.2; 427/131
(58) Field of Classification Search ............ 428/831.2, 428/694 TS, 693, 611, 900; 427/131, 128, 427/130
See application file for complete search history.

(56) References Cited

U.S. PATENT DOCUMENTS 5,679,473 A * 10/1997 Murayama et al. ...... 428/694 T
6,623,874 B2 * 9/2003 Kanbe et al. ........... 428/694 TS
2003/0157373 A1 * 8/2003 Kirino et al. .......... 428/694 DE

FOREIGN PATENT DOCUMENTS

| JP | 5-20673 | 1/1993 |
|---|---|---|
| JP | 5-49806 | 3/1993 |
| JP | 6-259743 | 9/1994 |
| JP | 8-255342 | 10/1996 |
| JP | 10-143838 | 5/1998 |
| JP | 2000-99944 | 4/2000 |
| JP | 2001-101651 | 4/2001 |

OTHER PUBLICATIONS

Japanese Office Action dated Jun. 7, 2005 corresponding to Japanese Patent Application 2001-320799.

* cited by examiner

*Primary Examiner*—Holly Rickman

(57) ABSTRACT

A magnetic recording medium and a manufacturing method therefore includes a protective film, a nonmagnetic substrate, a nonmagnetic base layer, a nonmagnetic intermediate layer, a magnetic layer, and a liquid lubricant layer. The nonmagnetic base layer has a body-centered cubic structure and a (200) plane including a crystal-orientation parallel with a surface of the protective film. The nonmagnetic intermediate layer has a hexagonal close-packed structure and a (110) plane including a crystal-orientation parallel with the surface of the protective film. The magnetic layer has a granular structure including hexagonal close-packed ferromagnetic crystal grains and oxide-based nonmagnetic grain boundaries surrounding the ferromagnetic crystal grains. The nonmagnetic base layer, the nonmagnetic intermediate layer, the magnetic layer, the protective film, and the liquid lubricant layer are sequentially stacked on the nonmagnetic substrate.

26 Claims, 3 Drawing Sheets

| | SEED LAYER | ORIENTATION CONTROL LAYER | BASE LAYER | INTERMEDIATE LAYER | MAGNETIC LAYER | MAGNETIC LAYER :Co-hcp I(110)/I(101) |
|---|---|---|---|---|---|---|
| EMBODIMENT 1 | Ni-25at%P | MgO | W | Ru | Co10Cr14Pt-7SiO2 | 5 |
| EMBODIMENT 2 | ← | ← | Mo | Ru | ← | 4 |
| EMBODIMENT 3 | ← | ← | W | Ir | ← | 5 |
| EMBODIMENT 4 | ← | ← | Ti-50at%W | Ru | ← | 10 |
| EMBODIMENT 5 | ← | ← | Ti-50at%Mo | Ru | ← | 8 |
| EMBODIMENT 6 | ← | ← | Ti-50at%W | Ru-50at%Mo | ← | >100 |
| COMPARATIVE EXAMPLE 1 | ← | ← | Cr-20at%Mo | Co-40at%Cr | ← | 2 |
| COMPARATIVE EXAMPLE 2 | ← | ← | Cr-20at%Mo | Ru | ← | <<1 |

FIG. 2

| | Hc [Oe] | Brδ [Gμm] | RESTORED OUTPUT [mVp-p] | MEDIA NOISE [μV] | SNR [dB] |
|---|---|---|---|---|---|
| EMBODIMENT1 | 3288 | 50 | 0.802 | 26.0 | 23.7 |
| EMBODIMENT2 | 3113 | 52 | 0.816 | 27.0 | 23.6 |
| EMBODIMENT3 | 3212 | 49 | 0.790 | 25.7 | 23.7 |
| EMBODIMENT4 | 3458 | 55 | 0.867 | 26.5 | 24.3 |
| EMBODIMENT5 | 3223 | 55 | 0.883 | 27.9 | 24.0 |
| EMBODIMENT6 | 3632 | 61 | 0.969 | 28.7 | 24.6 |
| COMPARATIVE EXAMPLE 1 | 2982 | 57 | 0.900 | 40.0 | 21.0 |
| COMPARATIVE EXAMPLE 2 | 2522 | 52 | 0.811 | 59.1 | 16.0 |

FIG. 3

MAGNETIC RECORDING MEDIUM AND MANUFACTURE METHOD THEREFOR

CROSS-REFERENCE TO RELATED APPLICATIONS

This application claims the benefit of Japanese Application No. 2001-320799, filed Oct. 18, 2001 in the Japanese Patent Office, the disclosure of which is incorporated herein by reference.

BACKGROUND OF THE INVENTION

1. Field of the Invention

The present invention relates to a magnetic recording medium that is mounted on various magnetic recording apparatuses including external recording devices for computers, and to a manufacturing method thereof.

2. Description of the Related Art

Magnetic recording media are desired to have increased recording density and reduced noise. Accordingly, various compositions and structures of a magnetic layer, materials for a nonmagnetic base layer, and the like have been proposed. In particular, in recent years, the magnetic layer commonly referred to as a "granular magnetic layer" has been proposed in which a nonmagnetic nonmetallic substance, such as an oxide or nitride surrounds a periphery of ferromagnetic crystal grains.

For example, Japanese Patent Application Laid Open Publication No. 8-255342 proposes that noise be reduced by sequentially stacking a nonmagnetic film, a ferromagnetic film, and a nonmagnetic film, and then heating the stack to form the granular recording layer in which ferromagnetic crystal grains are dispersed in the nonmagnetic film. In this case, the nonmagnetic film is composed of a silicon oxide, a silicon nitride, or the like. Further, U.S. Pat. No. 5,679,473 describes a method of using a CoNiPt target doped with an oxide such as $SiO_2$ to carry out an RF sputtering in order to form a granular recording film in which magnetic crystal grains are separated from one another and surrounded by a nonmagnetic oxide, thereby achieving reduced noise.

A reason the granular magnetic film features reduced noise properties has been assumed to be that a nonmagnetic, nonmetallic grain-boundary phase physically separates the magnetic grains from one another to weaken a magnetic interaction among the magnetic grains, thereby hindering zigzag magnetic domain walls from being formed in recording-bit transition regions. A conventional CoCr-based metallic magnetic film is formed at high temperatures, so that Cr is segregated from Co-based magnetic grains and deposited at a grain boundary to weaken the magnetic interaction among the magnetic grains. However, in the granular magnetic layer, the grain-boundary phase is a nonmagnetic, nonmetallic substance that is more likely to be deposited as Cr in the prior art, thereby advantageously allowing the magnetic grains to be isolated relatively easily. In particular, for the conventional CoCr-based metallic magnetic films, it is essential to increase the temperature of the substrate to 200° C. or higher during film formation in order to sufficiently deposit Cr. In contrast, there is the advantage that in the granular magnetic layer, even if film is formed without heating, the nonmagnetic, nonmetallic substance produces segregation.

Further, to increase the recording density and reduce the noise of a magnetic recording medium, an inter-grain magnetic interaction should be weakened by facilitating segregation in the magnetic layer, and a crystal orientation of the CoCr-based ferromagnetic crystal grains should be controlled. Specifically, the c-axis of the hexagonal close-packed ferromagnetic crystal grains should be oriented in a film surface. For this purpose, in a case of the prior art metallic magnetic layers, the crystal orientation of the magnetic layer is realized by controlling a structure and crystal orientation of the nonmagnetic base layer.

On the other hand, an effect of the nonmagnetic base layer has been considered small in magnetic recording media having a granular magnetic film, because the nonmagnetic base layer is separated from the ferromagnetic crystal grains by boundary segregation materials such as oxide. Journal of Magnetic Society of Japan, Vol. 23, No. 4-2, p. 1021 (1999) discloses that if a specific-composition CrMo alloy in which a (110) plane is favorably oriented and is used in the base layer, then (100) and (101) planes of the ferromagnetic crystal grains in the granular magnetic layer are favorably oriented and the magnetic properties and electromagnetic conversion properties are improved.

However, if the (101) plane of the ferromagnetic crystal grains is favorably oriented, a c-axis is not parallel with the film surface but stands on the film surface at a certain angle. Then, a magnetic anisotropy of the crystal grains has an element normal to the film surface, and a resulting vertical element of magnetism increases the media noise. Such a favorable orientation of the (101) plane of ferromagnetic crystal grains is caused by the favorable orientation of the (110) plane of the CrMo-alloy base layer. Accordingly, a control of the crystal orientation of the magnetic layer disclosed in the Journal of Magnetic Society of Japan is not sufficient. Thus, there is a need to precisely control the crystal orientation further to realize a medium of low noise.

We have disclosed in Japanese Laid Open Patent Application No. 2000-376597 that the orientation of the base layer and magnetic layer can be controlled by forming an amorphous seed layer and an orientation control layer on the nonmagnetic substrate.

For further improvement of the magnetic properties and reduction of noise, the magnetic layer is required to have stronger in-plane orientation and to achieve high-quality epitaxial growth. Thus it is necessary to optimize materials for the nonmagnetic base layer and the nonmagnetic intermediate layer to minimize misfit and ease downsizing of the particle size.

SUMMARY OF THE INVENTION

It is thus an aspect of the present invention to provide a magnetic recording medium and a manufacturing method thereof that can solve the above problems and realize excellent magnetic properties and electromagnetic conversion properties.

As a result of an intensive study described in Japanese Laid Open Patent Application No. 2000-376597 focusing on a property improvement provided by an in-plane orientation in a magnetic layer, the following is provided.

Namely, in Japanese Laid Open Patent Application No. 2000-376597, a c-axes of ferromagnetic crystal grains in a granular magnetic layer are oriented in parallel with a film surface by virtue of seed and orientation control layers. Further, studies have been conducted ensuring less misfit in a nonmagnetic base layer and a nonmagnetic intermediate layer to provide strong in-plane orientation and high-quality epitaxial growth. As a result, it has been found that, when forming a granular magnetic film including a CoPt-based-alloy ferromagnetic crystal grains with a hexagonal close-packed structure, the nonmagnetic base layer uses a material having a body-centered cubic (bcc) structure such as W, Mo, or V, and a (200) plane of the nonmagnetic base layer shows a favorable crystal-orientation parallel with the film surface. In addition, the nonmagnetic intermediate layer uses a material having a hexagonal close-packed (hcp) structure. A (110) plane of the nonmagnetic intermediate layer shows a favorable orientation parallel with the film surface so as to provide excellent magnetic properties and electromagnetic conversion properties.

An embodiment of the present invention has been developed with reference to the above insights, and the magnetic recording medium according to an embodiment the invention includes at least a nonmagnetic base layer, a nonmagnetic intermediate layer, a magnetic layer, a protective film, and a liquid lubricant layer sequentially stacked on a nonmagnetic substrate, wherein said magnetic layer has a granular structure including hexagonal close-packed ferromagnetic crystal grains, said nonmagnetic base layer has a body-centered cubic structure and a (200) plane having a crystal-orientation parallel with the protective film surface, and said nonmagnetic intermediate layer has a hexagonal close-packed structure and a (110) plane having a crystal-orientation parallel with the protective film surface.

A reason a Ti alloy with a structure that is not bcc, but hcp is used as a material for the nonmagnetic base layer is because Ti (amorphous-like) does not provide the orientation unique to the hcp structure, easily provides the desired bcc (200) orientation, and is suitable to control a lattice constant.

Excellent magnetic properties and electromagnetic conversion properties can be achieved by employing Ru, Ir, Rh, and Re or an Ru, Ir, Rh alloy including 10–60 at % Ti, C, W, Mo, or Cu in the nonmagnetic intermediate layer. Namely, in Japanese Laid Open Patent Application No. 2000-376597 using Cr or a Cr alloy in the nonmagnetic base layer, a misfit between the base layer and the magnetic layer is 7% or more. Further, if Ru and Re, which show better magnetic properties and electromagnetic conversion properties than CoCr alloys containing approximately 30–50% Cr, are used in the intermediate layer, an amount of misfit increases and the desired orientation is not achieved. As a result, various properties are degraded.

If the base layer and the intermediate layer, according to an embodiment of the present invention, are employed, all of the misfit between the nonmagnetic base layer, nonmagnetic intermediate layer, and granular magnetic layer becomes 3% or less, the c-axis of the magnetic layer is strongly oriented in parallel with the walls, and high-quality epitaxial growth is obtained. As a result, excellent properties are attained.

If an alloy containing Ti is employed in the base layer, better properties are provided. For example, if pure W is used, an a-axis length of the bcc (200) plane is 4.48 (Å). Meanwhile, in the Ti-50 at % W alloy, the a-axis becomes longer to 4.60 (Å) because Ti-hcp forms a solid solution in W-bcc without presenting orientation unique to the hcp structure (orientation is seen only for W-bcc (200)). As a result, the misfit with the nonmagnetic intermediate layer becomes smaller, and high-quality epitaxial growth is obtained.

Further, if the layered structure of the present invention is employed, it is easy to attain excellent magnetic properties and electromagnetic conversion properties. There is no need to heat the substrate during the film deposition of the medium of the invention. As a result, the manufacturing process is simplified and manufacturing costs are reduced.

At the same time, it becomes possible to use inexpensive plastic materials as substrates other than the conventional Al and glass substrates.

BRIEF DESCRIPTION OF THE DRAWINGS

These and other aspects and advantages of the invention will become apparent and more readily appreciated from the following description of the embodiments, taken in conjunction with the accompanying drawings of which:

FIG. 2 is a table listing values of an intensity ratio $I_{(110)}/I_{(101)}$ between a diffraction peak $I_{(101)}$ of a Co-hcp (101) plane and a diffraction peak $I_{(110)}$ of a Co-hcp (110) plane of a magnetic layer, obtained from a layered media structure and X-ray diffraction profiles.

FIG. 3 is a table listing a coercivity Hc, residual magnetic flux density×film thickness Brδ, restored output of electromagnetic conversion properties TAA at a linear density of 180 kFCe1, media noise, and an SNR value.

DETAILED DESCRIPTION OF THE PREFERRED EMBODIMENTS

Figure 1:
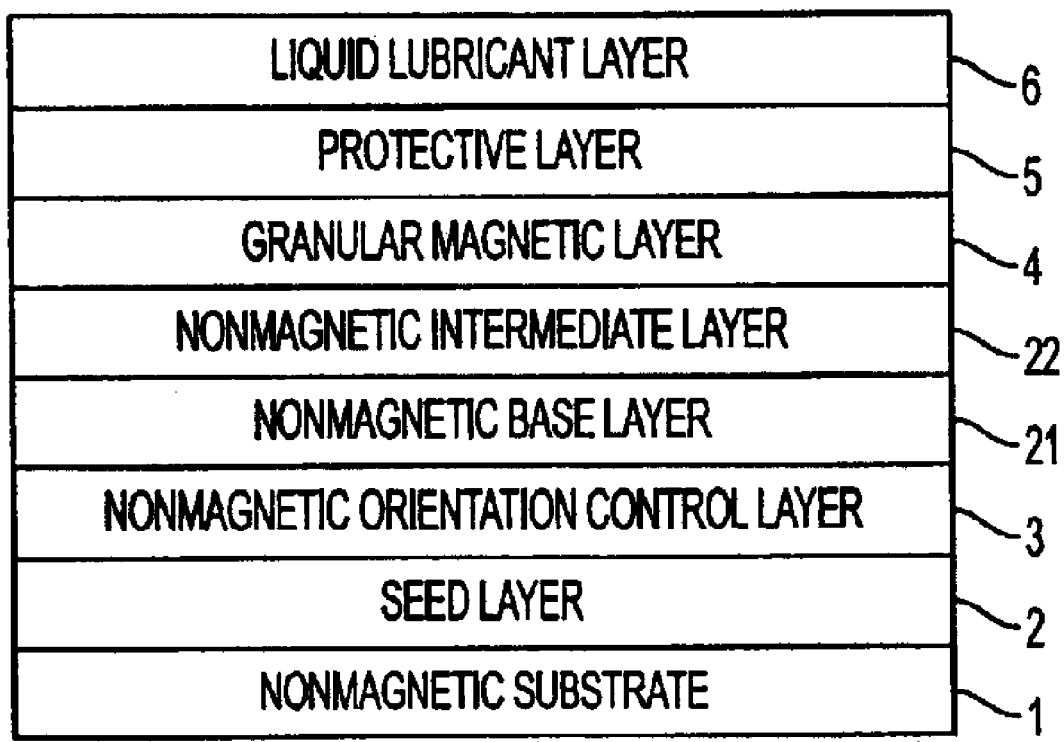
FIG. 1 is a schematic sectional view illustrating a structure of a magnetic recording medium according to an embodiment of the present invention.

Hereinafter, embodiments of the present invention will be described in detail with reference to the attached drawings. The present invention may, however, be embodied in many different forms and should not be construed as being limited to the embodiments set forth herein; rather, these embodiments are provided so that the present disclosure will be thorough and complete, and will fully convey the concept of the invention to those skilled in the art.

FIG. 1 is a schematic sectional view of the magnetic recording medium according to an embodiment of the present invention. The magnetic recording medium has a structure in which a seed layer 2, a nonmagnetic orientation control layer 3, a nonmagnetic base layer 21, a nonmagnetic intermediate layer 22, a granular magnetic layer 4, and a protective layer 5 are sequentially formed on a nonmagnetic substrate 1. Further, a liquid lubricant layer 6 is formed on these layers. For example, common substrate materials for magnetic recording media, such as NiP-plated Al alloys, reinforced glass, and crystallized glass, can be used in the nonmagnetic substrate 1. Additionally, because there is no need to heat the nonmagnetic substrate 1, substrates formed by the injection molding of resins, such as polycarbonate and polyolefin can be employed. Thin films of which the main constituent is carbon, for example, are used in the protective film 5. PAR-fluoropolyether-based lubricant agents, for example, can be used in the liquid lubricant layer 6.

The magnetic layer 4 is composed of ferromagnetic crystal grains and nonmagnetic boundaries surrounding the ferromagnetic crystal grains. The nonmagnetic boundary is what is referred to as a "granular magnetic layer," and is composed of metal oxides or nitrides. A structure of the granular magnetic layer can be formed by, for example, sputtering a target of a ferromagnetic metal containing oxides that will constitute the nonmagnetic boundaries. The granular magnetic layer can also be formed by a reactive sputtering of a ferromagnetic metal in an Ar atmosphere containing oxygen.

There are no limitations on the materials for the ferromagnetic crystal, but CoPt-based alloys may be used, for instance. In particular, Cr, Ni, or Ta, for example, may be added to the CoPt alloy to reduce media noise. On the other hand, as materials for the nonmagnetic boundaries, oxides of elements such as Cr, Co, Si, Al, Ti, Ta, Hf, and Zr may be used to ensure a stable granular structure. A thickness of the magnetic layer 4 is sufficiently thick to provide a sufficient magnitude of head-signal output during writing/reading.

The base layer 21 has a body-centered cubic structure (bcc structure), in principle, and a crystal-orientation of a (200) plane. Materials for the base layer 21 may be W, Mo, and V or a W, Mo, Cr, V alloy containing 10–60 at % Ti.

If 10–60 at % Ti, which has a hexagonal close-packed structure, is contained in a body-centered cubic W, Mo, Cr, and V, an orientation unique to the hexagonal close-packed structure does not appear. Instead, the orientation of the body-centered cubic (200) plane is effectively realized, with the body-centered cubic structure being maintained, and such a lattice constant is then obtained that has small misfit with the nonmagnetic intermediate layer 22 and the granular magnetic layer 4.

There are no limitations on the thickness of the nonmagnetic base layer 21, but the thickness may be approximately 5–100 nm. In order to obtain the crystal-orientation of the (200) plane, the nonmagnetic orientation control layer 3 is used, as described later.

In order to further control an orientation of a c-axis of the ferromagnetic crystal grains in the granular magnetic layer 4, the nonmagnetic intermediate layer 22 is formed between the nonmagnetic base layer 21 and the granular magnetic layer 4, according to an embodiment of the present invention. The nonmagnetic intermediate layer 22 may use a material that has the same hexagonal close-packed structure as that of the ferromagnetic crystal grains in the granular magnetic layer 4, and has an orientation of a (110) plane parallel with a film surface. Such a material may be Ru, Ir, Rh, and Re or an Ru, Ir, Rh alloy 10–60 at % of Ti, C, W, Mo, or Cu. There are no limitations on thickness of the nonmagnetic intermediate layer 22, but the thickness may be approximately 2–50 nm.

The misfit with the magnetic layer of the above material is considerably smaller than that of the CoCr-based alloy employed in the nonmagnetic intermediate layer in Japanese Patent Laid Open Publication No. 2000–376597. Further, because it is easy to make the crystal grains fine in the above material, the magnetic layer deposited thereon has high-quality epitaxial growth, and a stronger in-plane orientation of the c-axis may be realized. In addition, because the crystal grains in the magnetic layer can be made finer, a large noise-reduction effect is provided. If metals such as Ti, C, W, Mo, and Cu are added to Ru, Ir, Rh, or Re, such effects are augmented.

Further, in order to effectively control a crystal orientation in the nonmagnetic base layer, a nonmagnetic orientation control layer 3 having a simple cubic structure and showing a crystal-orientation of the (100) plane in parallel with the film surface can be deposited prior to the film deposition on the nonmagnetic base layer 21. In this case, the nonmagnetic orientation control layer 21 may be an oxide of at least one of Mg, Ti, V, and Mn, or a carbide or nitride of at least one of Ti, Zr, Hf, Nb, Ta, Mo, and W. All of these oxides have a simple cubic structure, and the crystal-orientation of their (100) planes are easily obtained during deposition by sputtering. A thickness of the nonmagnetic orientation control layer 3 may be thick enough to sufficiently control a crystal orientation in the nonmagnetic base layer 21.

Still further, in order to effectively control the crystal orientation and crystallization of the aforementioned nonmagnetic orientation control layer 3, the amorphous seed layer 2 is formed between the nonmagnetic substrate 1 and the nonmagnetic orientation control layer 3. In this case, the seed layer 2 may have an amorphous structure. However, if the film deposition by sputtering causes unavoidable crystallization in the seed layer, there is no change in the resulting effect. For example, if a Ni layer containing 10–40 at % P or a Si layer containing 25–55 at % oxygen is used in the seed layer 2, the orientation and crystallization of the nonmagnetic orientation control layer 3 can be improved. A thickness of the seed layer 2 may be thick enough to effectively control an orientation and a crystallization of the nonmagnetic orientation control layer 3.

In the manufacture of the magnetic recording medium shown in FIG. 1, which has the layered structure described above, if such a substrate heating process that has been conducted on the conventional magnetic recording media is omitted, higher Hc and lower media noise levels can be achieved, and manufacturing costs can be lowered by the simplified manufacturing process.

Next, different embodiments of the present invention will be described below with further reference to FIGS. 2 and 3.

As the nonmagnetic substrate, a smooth-surface chemically reinforced glass substrate (for example, a HOYA N-10 glass substrate) is mounted in a sputtering system after cleansing. After an Ni-25 % P seed layer of 10 nm in thickness is formed in a 5-mTorr Ar atmosphere, an MgO orientation control layer of 10 nm in thickness is formed in a 5-mTorr Ar atmosphere. Subsequently, a W base layer of 30 nm in thickness is formed in a 15-mTorr Ar atmosphere, and an Ru intermediate layer of 10 nm in thickness is formed in a 15-mTorr Ar atmosphere. After a granular magnetic layer of 15 nm in thickness is formed in an atmosphere of 30-mTorr Ar by the RF sputtering method using a CoCr10Pt14 target to which 7 mol % $SiO_2$ was added, a carbon protective film 10 nm in thickness is deposited. The layered structure is then removed from the evacuated atmosphere, and 1.5-bn liquid lubricant is applied to provide the magnetic recording medium shown in FIG. 1. No substrate heating is carried out prior to the film deposition (Embodiment 1).

A Mo base layer (Embodiment 2), Ti-50 at % W base layer (Embodiment 4), and Ti-50 at % base layer (Embodiment 5) are also formed by the same process as specified above, together with the other layers with the same compositions as specified above.

In addition, the films are formed with the same compositions and deposition process as specified above, except that a Ti-50 at % W intermediate layer of 10 nm in thickness is formed in a 15-mTorr Ar atmosphere (Embodiment 3).

Similarly, the films are formed with the same compositions and deposition process as specified above, except that a Ru-50 at % Mo intermediate layer of 10 nm in thickness is formed in a 15-mTorr Ar atmosphere after a Ti-50 at % W base layer of 30 nm in thickness is formed in a 15-mTorr Ar atmosphere (Embodiment 6).

As a comparative example, the films are formed with the same compositions and deposition process as specified above, except that a Cr-20 at % Mo layer of 30 nm in thickness is formed as the Cr-alloy base layer as disclosed in Japanese Patent Laid Open Application No. 2000–376597. A Co-40 at %Cr layer 10 nm in thickness is formed as the intermediate layer in a 15-mTorr Ar atmosphere (Comparative Example 1).

In addition, the films are formed with the same compositions and deposition process as in Comparative Example 1 above, except that an Ru intermediate layer of 10 nm in thickness is formed in a 15-mTorr Ar atmosphere (Comparative Example 2).

FIG. 2 (Table 1) shows the layered structure of each fabricated medium and the intensity ratio, $I_{(110)}/I_{(101)}$, between the magnetic-layer Co-hcp (111) diffraction peak intensity $I_{(101)}$ and the magnetic-layer Co-hcp (110) diffraction peak intensity $I_{(110)}$ provided by the X-ray diffraction profile. A Cu—K ray and a goniometer are used in the X-ray diffraction profile measurement. Because $I_{(110)}/I_{(101)}$ is 0.8 when the crystals are randomly oriented in the magnetic layer, the (110) plane can be considered to be oriented if $I_{(110)}/I_{(101)}$ is equal to or greater than 0.8.

As shown in Table 1, because $I_{(110)}/I_{(101)}$=2 in Comparative Example 1, in which the base layer is Cr-20 at % Mo and the intermediate layer is Co-40 at %Cr, an in-plane orientation may be realized in the magnetic layer. However, because $I_{(101)}$ has a meaningful value, that is, the c-axis is skewed off the film surface (leading to a perpendicular element of magnetism), neither a stronger in-plane orientation nor high-quality epitaxial growth are obtained.

On the other hand, Comparative Example 2 uses Cr-20 at % Mo in the base layer and Ru in the intermediate layer, because Ru makes it easier to downsize grains than the conventional CoCr-alloys, in order to improve various properties. Although the desired orientation, Cr-bcc (200), is obtained in the base layer by virtue of the seed layer/orientation control layer, the Ru intermediate layer does not show the desired Ru-bcp (110) orientation but almost a random structure because the misfit between the base layer and the intermediate layer is slightly larger than 7% and, thus, sufficient epitaxial growth is not attained.

Embodiments 1 through 6, with the goal of realizing an in-plane orientation in the magnetic layer, use an Ru, Ir, or Ru-50 at % Mo alloy in the intermediate layer because this alloy shows better properties than CoCr alloys. W, Mo, Ti-50 at % W, or Ti-50 at % Mo are used in the base layer formed under the intermediate layer, to ensure high-quality epitaxial growth from the base layer and a small amount of misfit. As a result, compared with Comparative Example 1, Embodiments 1 through 6 realize stronger in-plane orientations.

Specifically, in Embodiments 1, 2, and 3, in which the base layer and intermediate layer use a single element with no additive elements and the interlayer misfits are not optimized, the misfits are significantly small compared with a case in which the conventional Cr-alloy base layer/CiCr-alloy intermediate-layer structure is used. As a result, effective orientation control and epitaxial growth are obtained, and relatively strong in-plane orientations are provided, as indicated by $I_{(110)}/I_{(101)}$=4 or 5. In Embodiments 4 and 5, in which the base layer contains additive elements, because a lattice constant of the base layer material is increased, better epitaxial growth is provided. As a result, the effect of an embodiment of the present invention is enhanced, as indicated by $I_{(110)}/I_{(101)}$=8 or 10.

Further, in Embodiment 6, in which the base layer and intermediate layer contain additive elements, the strongest in-plane orientation in the embodiments is provided for the magnetic layer by virtue of the optimization of interlayer misfits.

FIG. 3 (Table 2) shows the coercivity Hc, residual magnetic flux density x film thickness, Brδ, restored output of electromagnetic conversion property TAA at a linear density of 180 kFCI, media noise, and SNR value for each of the individual embodiments and comparative examples.

The residual magnetic flux density x film thickness, Brδ, of these media stood between 49 and 61 G$\mu$m. These values of Hc and Brδ are measured using a vibrating sample magnetometer (VSM). The electromagnetic conversion properties are shown by the output of the isolated restored waveform, media noise, and SNR (signal-to-noise ratio) at a linear density of 180 kFCI, which are measured on GMR heads using a spin stand tester.

In terms of the magnetic properties, the magnitude of $I_{(110)}/I_{(101)}$, that is, the degree of in-plane orientation, is directly reflected in the magnitude of coercivity Hc. Compared with Comparative Example 1, in which the orientations of the Cr-alloy base layer and the CoCr-alloy intermediate layer are controlled, Embodiment 6, in which in-plane orientation of the magnetic layer has also been attained and $I_{(110)}/I_{(101)}$ has the largest value, shows an Hc increase of as much as approximately 600 Oe.

Meanwhile, with respect to the electromagnetic conversion property, the SNR is improved when the in-plane orientation is facilitated (when better epitaxial growth is realized). In Comparative Example 1 and Embodiment 1, in which the orientation is controlled in the same way, the SNR is significantly improved by as much as +2.7 dB. A reason noise is reduced is because the crystal grain size in the Ru (for example) intermediate layer is smaller than that in the conventional CoCr-alloy intermediate layer, and because the crystal grain size in the magnetic layer formed thereon, accordingly, becomes smaller.

As described above, to form a granular magnetic film including CoPt-alloy ferromagnetic crystal grains of the hexagonal close-packed structure, an embodiment according to the present invention uses a material having a body-centered cubic structure or a body-centered cubic structure plus a hexagonal close-packed structure. The material according to an embodiment of the present invention has a (200) plane having a orientation crystal oriented in parallel with the film surface in the nonmagnetic base layer, uses a material such as Ru that has a hexagonal close-packed structure, and has a (110) plane oriented in parallel with the film surface in the nonmagnetic intermediate layer. As a result, excellent magnetic properties and electromagnetic conversion properties can be attained.

Japanese Patent Laid Open Application No. 2000-376597 discloses that the crystal orientation in the base and magnetic layers can be controlled by forming an amorphous seed layer and an orientation control layer on the nonmagnetic substrate. According to embodiments of the present invention, SNR can be further improved (the noise level can be further reduced) through a combination of the orientation control and downsizing of the magnetic-layer crystal grains in the intermediate layer made of Ru or the like. Due to a large degree of misfit with a Cr-alloy base layer, the intermediate layer made of Ru or the like cannot be used in the Japanese Patent Laid Open Application No. 2000-376597. However, according to embodiments of the present invention, the nonmagnetic base layer uses W, Mo, and V or a W, Mo, Cr, V alloy containing 10–50 at % Ti and the misfit becomes 3% or less. As a result, while an intermediate layer made of Ru or the like is used, it becomes possible to realize strong in-plane orientation in the magnetic layer formed thereon, while at the same time downsizing the crystal grain size. As a result, various properties can be improved considerably.

Because excellent properties can be provided by the layered structure according to the embodiments of the present invention as described above, it becomes unnecessary to heat the substrate during deposition of the medium of the present invention. As a result, in addition to the conventional Al and glass substrates, inexpensive plastic substrates can be employed.

The various features and advantages of the invention are apparent from the detailed specification and, thus, it is intended by the appended claims to cover such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A magnetic recording medium, comprising:
   a protective film;
   a nonmagnetic substrate;
   a nonmagnetic base layer having a body-centered cubic structure and a (200) plane comprising a crystal-orientation parallel with a surface of the protective film;
   a nonmagnetic intermediate layer having a hexagonal close-packed structure and a (110) plane comprising a crystal-orientation parallel with the surface of the protective, film;
   a magnetic layer having a granular structure comprising hexagonal close-packed ferromagnetic crystal grains and oxide-based nonmagnetic grain boundaries surrounding the ferromagnetic crystal grains;
   a liquid lubricant layer, wherein the nonmagnetic base layer, the nonmagnetic intermediate layer, the magnetic layer, the protective film, and the liquid lubricant layer are sequentially stacked on the nonmagnetic substrate, and
   a nonmagnetic orientation control layer of a simple cubic structure formed between the nonmagnetic base layer and the substrate, and the crystal-orientation parallel with the film surface is the (110) plane.

2. A magnetic recording medium, comprising:
   a protective film;
   a nonmagnetic substrate;
   a nonmagnetic base layer having a body-centered cubic structure and a (200) plane comprising a crystal-orientation parallel with a surface of the protective film;
   a nonmagnetic intermediate layer having a hexagonal close-packed structure and a (110) plane comprising a crystal-orientation parallel with the surface of the protective film;
   a magnetic layer having a granular structure comprising hexagonal close-packed ferromagnetic crystal grains and oxide-based nonmagnetic grain boundaries surrounding the ferromagnetic crystal grains;
   a liquid lubricant layer, wherein the nonmagnetic base layer, the nonmagnetic intermediate layer, the magnetic layer, the protective film, and the liquid lubricant layer are sequentially stacked on the nonmagnetic substrate; and
   a nonmagnetic orientation control layer of a simple cubic structure formed between the nonmagnetic base layer and the substrate, and the crystal-orientation parallel with the film surface is the (110) plane,
   wherein the nonmagnetic base layer comprises a material selected from the group of alloys and elements consisting of W, Mo, V and alloys of W, Mo, Cr, or V with 10–60 at % Ti.

3. The magnetic recording medium as recited in claim 2, wherein the nonmagnetic orientation control layer is at least one of Mg, Ti, V, or Mn, or a carbide or a nitride of at least one of Ti, Zr, Hf, Nb, Ta, Mo, or W.

4. The magnetic recording medium as recited in claim 3, further comprising:
   an amorphous seed layer formed between the nonmagnetic orientation control layer and the substrate.

5. The magnetic recording medium as recited in claim 4, wherein the seed layer is a Ni layer comprising 10–40 at % P or a Si layer containing 25–55 at % oxygen.

6. The magnetic recording medium as recited in claim 5, wherein the nonmagnetic grain boundaries in the magnetic layer comprise an oxide or a nitride of at least one of Cr, Co, Si, Al, Ta, Hf, or Zr.

7. The magnetic recording medium as recited in claim 6, wherein the nonmagnetic intermediate layer comprises a material selected from the group of alloys and elements consisting of Ru, Ir, Rh, and alloys of Ru, Ir, Rh, or Re containing 10–60 at % Ti, C, W, Mo, or Cu.

8. The magnetic recording medium as recited in claim 1, wherein the nonmagnetic grain boundaries in the magnetic layer comprise an oxide or a nitride of at least one of Cr, Co, Si, Al, Ta, Hf, or Zr.

9. The magnetic recording medium as recited in claim 8, wherein the nonmagnetic substrate is a crystallized glass, a chemically reinforced glass, or a synthetic resin.

10. The magnetic recording medium as recited in claim 1, wherein the nonmagnetic intermediate layer comprises a material selected from the group at alloys and elements consisting of Ru, Ir, Rh, and alloys of Ru, Ir, Rh, or Re containing 10–60 at % Ti, C, W, Mo, or Cu.

11. The magnetic recording medium as recited in claim 10, wherein the nonmagnetic base layer comprises a material selected from the group of alloys and elements consisting of W, Mo, V and alloys of W, Mo, Cr, or V with 10–60 at % Ti.

12. The magnetic recording medium as recited in claim 1, wherein the nonmagnetic substrate is a crystallized glass, a chemically reinforced glass, or a synthetic resin.

13. A manufacturing method of a magnetic recording medium, comprising:
   sequentially stacking on a nonmagnetic substrate a nonmagnetic base layer, a nonmagnetic intermediate layer, a magnetic layer, a protective film, and a liquid lubricant layer, wherein the nonmagnetic base layer comprises a body-centered cubic structure and a (200) plane having a crystal-orientation parallel with a surface of the protective film, the nonmagnetic intermediate layer comprises a hexagonal close-packed structure and a (110) plane having a crystal-orientation parallel with the surface of the protective film, and the magnetic layer comprises a granular structure having hexagonal close-packed ferromagnetic crystal grains and oxide-based nonmagnetic grain boundaries surrounding the ferromagnetic crystal grains;
   executing a film formation process without heating the nonmagnetic substrate in advance; and
   forming a nonmagnetic orientation control layer of a simple cubic structure between the nonmagnetic base layer and the substrate, and the crystal-orientation parallel with the film surface is the (110) plane.

14. The method as recited in claim 13, wherein the nonmagnetic base layer comprises a material selected from the group of alloys and elements consisting of W, Mo, and alloys of W, Mo, Cr, or V having 10–60 at % Ti.

15. The method as recited in claim 13, wherein the nonmagnetic orientation control layer is an oxide of at least one of Mg, Ti, V, or Mn, or a carbide or a nitride of at least one of Ti, Zr, Hf, Nb, Ta, Mo, or W.

16. The method as recited in claim 15, further comprising:
forming an amorphous seed layer between the nonmagnetic orientation control layer and the substrate.

17. The method as recited in claim 16, wherein the seed layer is a Ni layer comprising 10–40 at % P or a Si layer containing 25–55 at % oxygen.

18. A manufacturing method of a magnetic recording medium, comprising:
sequentially stacking on a nonmagnetic substrate a nonmagnetic base layer, a nonmagnetic intermediate layer, a magnetic layer, a protective film, and a liquid lubricant layer, wherein the nonmagnetic base layer comprises a body-centered cubic structure and a (200) plane having a crystal-orientation parallel with a surface of the protective film, the nonmagnetic intermediate layer comprises a hexagonal close-packed structure and a (110) plane having a crystal-orientation parallel with the surface of the protective film, and the magnetic layer comprises a granular structure having hexagonal close-packed ferromagnetic crystal grains and oxide-based nonmagnetic grain boundaries surrounding the ferromagnetic crystal grains; and
executing a film formation process without heating the nonmagnetic substrate in advance, forming a nonmagnetic orientation control layer of a simple cubic structure between the nonmagnetic base layer and the substrate, and the crystal-orientation parallel with the film surface is the (110) plane,
wherein the nonmagnetic grain boundaries in the magnetic layer consists of an oxide or a nitride of at least one of Cr, Co, Si, Al, Ta, Hf, or Zr.

19. A manufacturing method of a magnetic recording medium, comprising:
sequentially stacking on a nonmagnetic substrate a nonmagnetic base layer, a nonmagnetic intermediate layer, a magnetic layer, a protective film, and a liquid lubricant layer, wherein the nonmagnetic base layer comprises a body-centered cubic structure and a (200) plane having a crystal-orientation parallel with a surface of the protective film, the nonmagnetic intermediate layer comprises a hexagonal close-packed structure and a (110) plane having a crystal-orientation parallel with the surface of the protective film, and the magnetic layer comprises a granular structure having hexagonal close-packed ferromagnetic crystal grains and oxide-based nonmagnetic grain boundaries surrounding the ferromagnetic crystal grains; and
executing a film formation process without heating the nonmagnetic substrate in advance,
wherein the nonmagnetic intermediate layer comprises a material selected from the group of alloys and elements consisting of Ru, Ir, Rh, and alloys of Ru, Ir, Rh, or Re containing 10–60 at % Ti, C, W, Mo or Cu.

20. The method as recited in claim 13, wherein the nonmagnetic substrate is a crystallized glass, a chemically reinforced glass, or a synthetic resin.

21. The magnetic recording medium as recited in claim 1, wherein the nonmagnetic base layer comprises a material selected from the group of alloys and elements consisting of W, Mo, V and alloys of W, Mo, Cr, or V having 10–60 at % Ti and wherein the nonmagnetic intermediate layer comprises a material selected from the group of alloys and elements consisting of Ru, Ir, Rh, Re and alloys of Ru, Ir, Rh, or Re containing 10–60 at % Ti, C, W, Mo or Cu.

22. The magnetic recording medium as recited in claim 1, further comprising:
a nonmagnetic orientation control layer of a simple cubic structure formed between the nonmagnetic base layer and the substrate, and the crystal-orientation parallel with the film surface is the (110) plane, wherein the nonmagnetic intermediate layer comprises a material selected from the group of alloys and elements consisting of Ru, Ir, Rh, Re and alloys of Ru, Ir, Rh, or Re containing 10–60 at % Ti, C, W, Mo or Cu.

23. The magnetic recording medium as recited in claim 2, further comprising:
a nonmagnetic orientation control layer of a simple cubic structure formed between the nonmagnetic base layer and the substrate, and the crystal-orientation parallel with the film surface is the (110) plane, wherein the nonmagnetic intermediate layer comprises a material selected from the group of alloys and elements consisting of Ru, Ir, Rh, Re, ad alloys of Ru, Ir, Rh, or Re containing 10–60 at % Ti, C, W, Mo, or Cu, and wherein the nonmagnetic orientation control layer is an oxide of at least one of Mg, Ti, V, or Mn, or a carbide or a nitride of at least one of Ti, Zr, Hf, Nb, Ta, Mo, or W.

24. The magnetic recording medium as recited in claim 2, further comprising:
a nonmagnetic orientation control layer of a simple cubic structure formed between the nonmagnetic base layer and the substrate, and the crystal-orientation parallel with the film surface is the (110) plane, wherein the nonmagnetic intermediate layer comprises a material selected from the group of alloys and elements consisting of Ru, Ir, Rh, Re and alloys of Ru, Ir, Rh, or Re containing 10–60 at % Ti, C, W, Mo or Cu; and
an amorphous seed layer formed between the nonmagnetic orientation control layer and the substrate.

25. The magnetic recording medium as recited in claim 2, further comprising:
a nonmagnetic orientation control layer of a simple cubic structure formed between the nonmagnetic base layer and the substrate, and the crystal-orientation parallel with the film surface is the (110) plane, wherein the nonmagnetic intermediate layer comprises a material selected from the group of alloys and elements consisting of Ru, Ir, Rh, Re and alloys of Ru, Ir, Rh, or Re containing 10–60 at % Ti, C, W, Mo or Cu; and
a amorphous seed layer formed between the nonmagnetic orientation control layer and the substrate,
wherein the seed layer is a Ni layer comprising 10–40 at % P or a Si layer containing 25–55 at % oxygen.

26. The magnetic recording medium as recited in claim 1, wherein the nonmagnetic intermediate layer comprises a material selected from the group of alloys and elements consisting of Ru, Ir, Rh, Re and alloys of Ru, Ir, Rh, or Re containing 10–60 at % Ti, C, W, Mo or Cu, and wherein the nonmagnetic grain boundaries in the magnetic layer comprise an oxide or a nitride of at least one of Cr, Co, Si, Al, Ta, Hf, or Zr.

* * * * *

UNITED STATES PATENT AND TRADEMARK OFFICE
CERTIFICATE OF CORRECTION

PATENT NO. : 6,994,924 B2
APPLICATION NO. : 10/273364
DATED : February 7, 2006
INVENTOR(S) : Tadaaki Oikawa et al.

Page 1 of 1

It is certified that error appears in the above-identified patent and that said Letters Patent is hereby corrected as shown below:

First Page, Column 1 (Inventors), Line 4, delete "Myabi" and insert -- Miyabi -- therefor.
First Page, Column 2 (U.S. Patent Documents), Line 2, delete "428/694 DE" and insert -- 428/694.0DE -- therefor.
Column 9, Line 24 (claim 1, line 10), after "protective" delete ",".
Column 9, Line 32 (claim 1, line 18), after "substrate" delete "," and insert -- ; -- therefor.
Column 9, Line 67 (claim 3, line 2), after "is" insert -- an oxide of --.
Column 10, Line 17 (claim 7, line 4), insert -- Re -- before "and".
Column 10, Line 27 (claim 10, line 3), delete "at" and insert -- of -- therefor.
Column 10, Line 28 (claim 10, line 4), insert -- Re -- before "and".
Column 10, Line 29 (claim 10, line 5), after "Mo" delete ",".
Column 10, Line 62 (claim 14, line 3), insert -- V -- after "Mo," and before "and" (2nd.occurence).
Column 11, Line 24 (claim 18, after line 22), before "forming" begin new paragraph.
Column 11, Line 31 (claim 18, line 31), delete "consists of" and insert -- comprise -- therefor.
Column 11, Line 51 (claim 19, line 51), delete "comprises" and insert -- consists of -- therefor.
Column 11, Line 53 (claim 19, line 3), insert -- Re -- before "and".
Column 12, Line 21 (claim 23, line 21), after "Re" delete ",ad" and insert -- and -- therefor.
Column 12, Line 22 (claim 23, line 22), after "Mo" delete ",".
Column 12, Line 50 (claim 24, line 50), delete "a" and insert -- an -- therefor.

Signed and Sealed this

Fourteenth Day of November, 2006

JON W. DUDAS
*Director of the United States Patent and Trademark Office*